United States Patent [19]
Sprague et al.

[11] Patent Number: 5,581,022
[45] Date of Patent: Dec. 3, 1996

[54] ENGINE MISFIRE DETECTOR

[75] Inventors: Fred P. Sprague; Erik B. Vigmostad, both of Fairfield, Iowa

[73] Assignee: Sensortech L.P., Fairfield, Iowa

[21] Appl. No.: 490,941

[22] Filed: Jun. 15, 1995

[51] Int. Cl.$^6$ ................................................. G01M 15/00
[52] U.S. Cl. ................................. 73/117.3; 364/431.07; 123/436
[58] Field of Search ......................... 364/431.07; 73/116, 73/117.2, 117.3; 123/436, 675, 682

[56] References Cited

U.S. PATENT DOCUMENTS

| | | | |
|---|---|---|---|
| 4,399,407 | 8/1983 | Kling et al. | 73/117.3 |
| 4,424,709 | 1/1984 | Meier, Jr. et al. | 73/117.3 |
| 4,586,369 | 5/1986 | Vogler | 73/117.3 |
| 5,263,453 | 11/1993 | Wakahara et al. | 73/117.3 |
| 5,287,737 | 2/1994 | Osawa et al. | 73/117.3 |
| 5,303,158 | 4/1994 | Kuroda | 73/117.3 |
| 5,379,634 | 1/1995 | Kuroda et al. | 73/116 |
| 5,394,330 | 2/1995 | Horner | 73/117.3 |
| 5,440,921 | 8/1995 | Matsuno et al. | 73/117.3 |
| 5,471,869 | 12/1995 | Kuroda et al. | 73/117.3 |

Primary Examiner—Richard Chilcot
Assistant Examiner—George M. Dombroske
Attorney, Agent, or Firm—Michael, Best & Friedrich

[57] ABSTRACT

A system for determining the occurrence of a misfire in an internal combustion engine includes an oscillator, a phase detector coupled to receive an engine timing signal and the oscillating signal from the oscillator for producing an error signal functionally relating to phase difference between the signals. A loop filter is coupled to the phase detector for producing a tracking signal for producing the oscillating signal functionally related to the tracking signal. A phase error accumulator is coupled to receive the error signal and is operative to produce an output signal when the magnitude of at least one of the duration and magnitude of the error signal exceeds a predetermined value.

43 Claims, 3 Drawing Sheets

ENGINE MISFIRE DETECTOR

BACKGROUND OF THE INVENTION

This invention relates to a system for detecting the occurrence of a misfire in an internal combustion engine.

One of the major causes of air pollution generated by internal combustion engines is the discharge of unburned hydrocarbons which may occur, for example, should one or more of the engine's cylinders misfire. Therefore, it is important in minimizing such air pollution to determine the occurrence of such misfire events.

Prior art systems for detecting misfires in internal combustion engines monitor the speed and acceleration of the engine crankshaft. Misfire events are associated with rapid deceleration. Speed and acceleration are usually determined by accurately measuring the time between subsequent engine control signals (associated with the rotation of the crankshaft). Elaborate software techniques are used to calculate running averages and other statistical properties of the engine dynamics.

Such prior art systems are not wholly satisfactory because they require significant engine controller computer resources. In addition, such systems did not provide adequate results at high RPM rates under low load conditions, especially for engines of eight or more cylinders. In addition, such systems had difficulty differentiating between engine transients resulting from normal vehicle operation and misfire events.

SUMMARY OF THE INVENTION

It is an object of the invention to provide a new and improved method and system for determining the occurrence of a misfire in an internal combustion engine.

Another object of the invention is to provide a system for determining changes in engine acceleration directly with low computational overhead.

A further object of the invention is to provide a system for determining internal combustion engine misfires which rejects gradual changes in acceleration typical of normal operation but which is sensitive to rapid transients and deceleration typical of misfire events.

Yet another object of the invention is to provide a relatively inexpensive method and system for determining misfire events in internal combustion engines.

A still further object of the invention is to provide a system for detecting misfire events and which is sensitive at high speed and low load in multi-cylinder engines.

These and other objects and advantages of the invention will become more apparent from the detailed description thereof taken with the accompanying drawings.

In general terms, the invention comprises a system for determining the occurrence of a misfire in an internal combustion engine including means for generating an oscillating signal, means for comparing an engine ignition timing signal with the oscillating signal and for generating an error signal from the comparison, means coupled to receive the error signal for producing a tracking signal which tracks changes in engine speed, the oscillating means being coupled to receive the tracking signal for generating an oscillating signal whose frequency changes in relation to changes in the tracking signal, and means coupled to receive the error signal and responsive to changes in the error signal indicative of engine cylinder misfire and non-responsive to changes in the error signal associated with normal engine operation.

According to another aspect, the invention comprises a method for determining the occurrence of a misfire in an internal combustion engine including the steps of generating an oscillating signal, comparing an engine ignition timing signal from the engine with the oscillating signal, generating an error signal from the comparison of the engine timing signal and the oscillating signal, generating a tracking signal which tracks changes in the error signal resulting from changes in engine speed, generating the oscillating signal as a function of the tracking signal, sensing the occurrence of a transient deceleration of the engine speed from at least one of the amplitude and duration of the error signal indicative of engine misfires, and rejecting changes in error signal associated with linear acceleration and deceleration, and counting said occurrences.

DETAILED DESCRIPTION OF THE PREFERRED EMBODIMENTS

Figure 1:
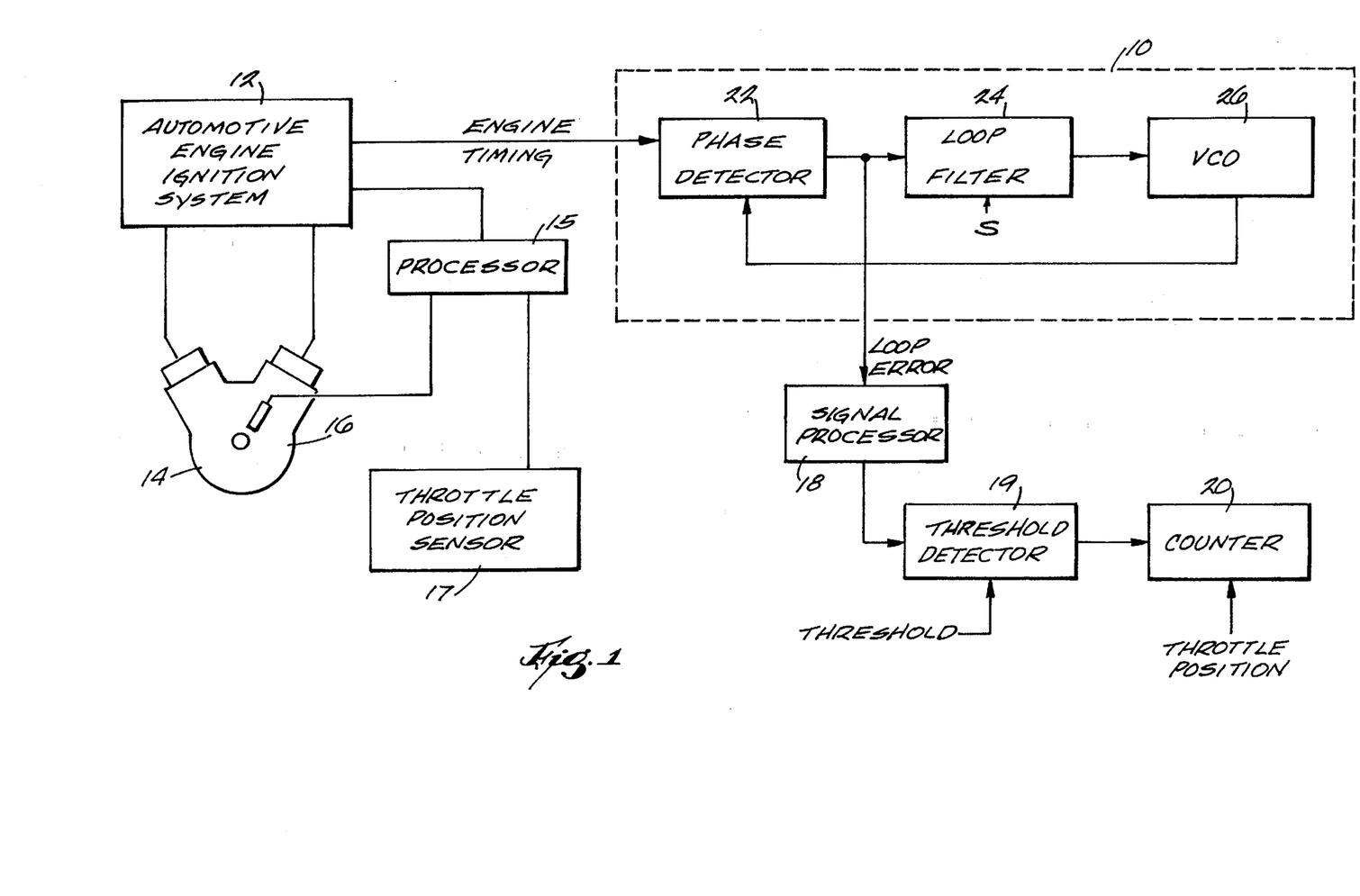
FIG. 1 schematically illustrates a first embodiment of the invention.

FIG. 1 systematically illustrates an engine cylinder misfire detection system according to a first embodiment of the invention and including a phase locked loop (PLL) circuit 10 coupled to receive an engine timing signal from an automotive engine ignition system 12. As those skilled in the art will appreciate, the ignition system 12 is coupled to an engine 14 for providing ignition signals to the engine cylinders in a predetermined timed sequence under the control of a microprocessor 15. The timing of the ignition signals is determined by various engine parameters in a manner well-known in the art. Among the sensors which provide signals to the processor 15 are a cam shaft position sensor 16, a crank shaft position sensor and a throttle position sensor 17.

The PLL circuit 10 is operative to provide an error signal to a signal processor 18 which is a function of changes in the frequency of the ignition timing signals. The signal processor 18 is coupled to receive the error signal from the PLL circuit for determining whether there is a large transient deceleration in the ignition signals as would occur in the event of a cylinder misfire. The output of the signal processor 18 is provided to threshold detector 19 which compares this signal to a threshold reference signal and produces an output to a counter 20 when the signal from the signal processor 18 exceeds the threshold value. The counter 20, which may be a part of the engine control system records the number of detected misfires.

The PLL circuit 10 includes a phase detector 22, a loop filter 24 and a voltage controlled oscillator (VCO) 26. The phase detector 22 compares the phase of the engine timing signal to the output signal from the VCO and provides a phase error signal which is a function of the magnitude and the direction that the engine timing signal and the VCO output signal are out of phase. The phase error signal is provided to the signal processor 18 and the loop filter 24 which acts to smooth the error signal from an oscillating signal to a variable DC signal which tracks changes in the engine timing signal that occurred during acceleration and deceleration. The VCO output varies with the DC input signal from the loop filter 24 and is fed back to the phase detector 22.

The signal processor 18 responds to the amplitude and/or the duration of the error signal to determine if there is a large transient deceleration signal characteristic of a misfire and rejects acceleration signals. The output of the signal processor 18 is a function of the amplitude and/or the duration of the error signal which is compared to a predetermined threshold signal by the threshold detector 19. If the signal from the signal processor 18 exceeds the threshold signal, the counter 20 is actuated as an indication of the occurrence of a misfire.

Figure 2:
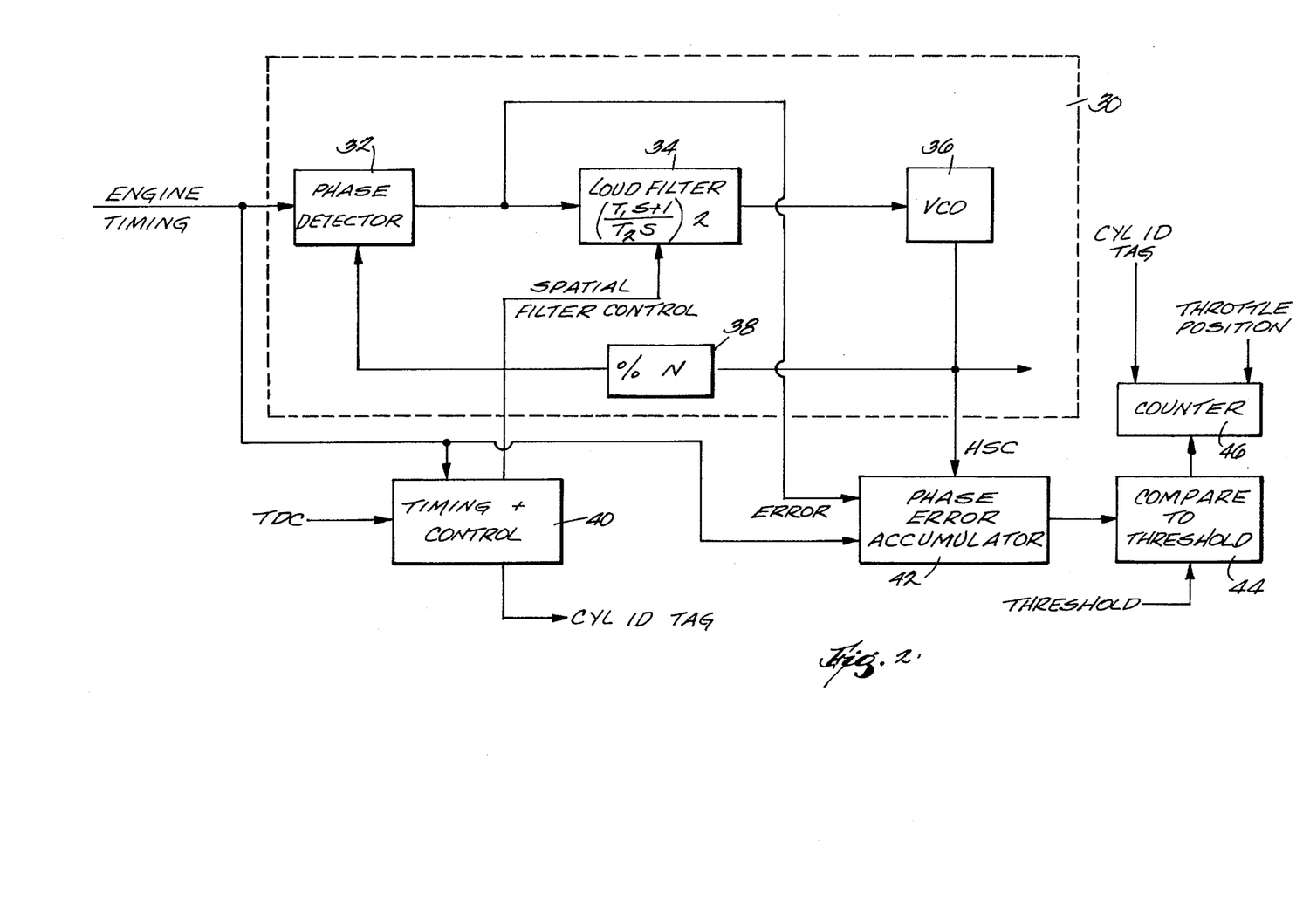
FIG. 2 schematically illustrates a second embodiment of the invention.

FIG. 2 shows an alternate embodiment of the invention in which the PLL circuit 30 includes a phase detector 32, a loop filter 34, a VCO 36 and a divide by N circuit 38. The loop filter 34 is controlled by a spatial filter control signal from the timing and control circuit 40 and the output of the VCO 36 is divided by N circuit 38 prior to the input of the VCO output signal to the phase detector 32.

The function of the loop filter 34 is to enhance the system's capability of detecting rapid misfire deceleration while rejecting changes in engine speed under normal operating conditions. This is accomplished by operating the loop filter in accordance with a suitable transfer function such as, for example:

$$(K_1S^2+K_2S+K_3)/S^2$$

Where:

$K_1$, $K_2$ and $K_3$ are constants and S is the Laplace transform variable.

While any suitable transfer function may be employed, the illustrated embodiment employs the following transfer function:

$$[(T_2S+1)/T_1S]^2$$

Where:

$T_1$ and $T_2$ are time constants which are varied by the timing and control circuit 40.

This provides a spatial filter whose characteristics track engine RPM.

The timing and control circuit 40 receives a first signal TDC which is the top dead center signal from the cam shaft position sensor 16 and the engine timing signal. The timing and control circuit 40 provides the loop filter 34 with the spatial filter control signal and a cylinder ID Tag signal to the counter 46.

The divide by N circuit 38 permits the VCO to run at a higher frequency and this signal is provided to the phase error accumulator as a high speed clock (HSC) signal which is synchronous with the engine timing signal and drives the accumulator. The phase error accumulator 42 receives the error signal and the engine timing signal and includes a counter that increments at the rate of the HSC signal and integrates the error signal during each cylinder firing cycle. The count from the phase error accumulator 42 is provided to the comparison circuit 44 which compares this signal with a threshold value. If the count exceeds the threshold, a misfire has occurred and an output signal is provided to the counter 46.

The timing and control circuit 40 adjusts the spatial filter control time constants $T_2$ and $T_1$ in relation to engine speed as reflected in the top dead center signal TDC and the engine timing signal ETC. For example, if the time constant T2 is X at idle speed, the time constant would be X/3 at an engine speed of 3 times idle. The spatial control signal varies the T2 variable in the loop filter inversely proportional to engine RPM such that the transient response of the loop is constant with respect to the engine rotational speed.

Alternatively, the loop filter time constants may remain fixed and the threshold levels varied inversely with engine RPM. Such a variable threshold would be stored in a read only memory (ROM) and updated periodically to reflect the current engine RPM. The net effect would be the same as varying the time constants with a fixed threshold.

The loop filters may be implemented with switched capacitor filters set to vary their bandwidth inversely with engine RPM. This would have the same effect as changing time constants.

Under steady state conditions, linear acceleration or linear deceleration of the engine, the loop error signal has zero DC phase error. The transition from one condition to another, that is from steady state constant RPM to linear acceleration, does cause some DC error. As the voltage at the input of the VCO increases linearly, the output frequency also changes linearly. It is this action that allows the loop to track linear acceleration and deceleration without any further DC error. As a result, the system can track changes in the engine RPM with only the small transient DC error that occurs when the state of the engine RPM changes.

Should a misfire occur, either under steady state or linear accelerating or decelerating conditions, an abrupt change or decrease will occur in the frequency of the engine timing signal. This produces a large DC loop phase error signal which is sufficient to actuate the threshold detector 19.

Figure 3:
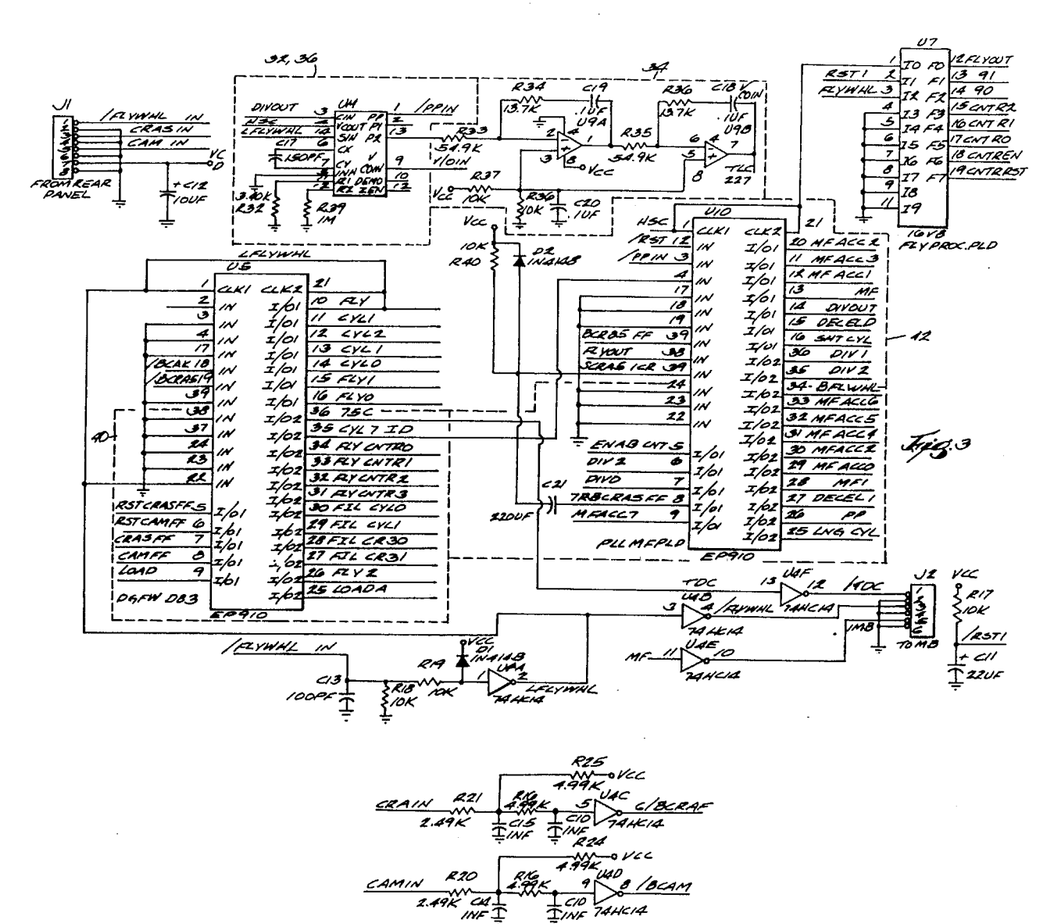
FIG. 3 shows the embodiment of FIG. 2 in greater detail.

FIG. 3 shows the engine misfire detection system of FIG. 2 in greater detail. The phase detector 32 and the VCO 36 are provided in the integrated circuit U8. The timing and control function, the phase error accumulator and the divide by N module are provided by the programmable logic elements U5 and U10.

The loop filter 34, which receives an input signal from the phase detector and provides the VCO input signal comprises the operational amplifiers U9A and U9B. This provides two lag/lead sections each with the form $(T_2S+1/T_1S)$. It is not necessary that each section have the same coefficients, but it is desirable to have an $1/S^2$ term in the loop filter transfer function so that the DC phase error signal occurs under appropriate conditions. The loop filter may also be provided with three filter sections with the overall transfer function having $1/S^3$ in the denominator. Such a loop filter would track RPM square law changes in the engine output frequency with zero DC phase error.

In the illustrated embodiment, the phase error signal may have both DC and AC components. Under steady state engine operation or under linear acceleration and deceleration, the DC portion of the phase error signal is zero. Some DC error does occur as the engine RPM begins to change from a steady state condition to a linear deceleration condition, or from a linear acceleration condition to steady state conditions. The DC error is integrated and stored in the capacitance of the first stage of the loop filter 34 and this stored value is fed to the second stage of the loop filter, which also contains an integrator and enables the output of the loop filter to rise in a linear fashion. As a result, the DC error forces the loop filter to track the engine variations precisely in both frequency and phase after some time delay related to the amplitude of the disturbance and the loop filter time constants. The illustrated system processes these transient loop phase error signals in amplitude and/or duration to determine if a misfire has occurred.

Normal driving conditions can also cause abrupt changes in engine RPM. The phase error signal processor 42 accepts deceleration transients but tends to reject acceleration transients. Because the misfire event is a high speed phenomenon, it produces a relatively large DC phase error signal.

As the voltage at the input of the VCO increases linearly, the output frequency also changes linearly. This allows the loop to track linear acceleration and deceleration without any further DC error. In other words, the system thereby tracks linear changes in the engine RPM with only a small transient DC error that occurs when the state of the engine RPM changes.

The DC loop phase error signal is used by the loop filter 34 to cause the VCO input to change its absolute voltage level as required to keep the phase of the output from the PLL identical to its input. The VCO input voltage rises as engine RPM is increased and falls as engine RPM is decreased. The loop filter determines how fast and in what manner the PLL system 30 will track changes in the engine RPM. In the illustrated embodiment, the loop filter is selected to track engine timing signal with zero DC phase error. The constants are selected for specific operating RPM such that the error from a cylinder misfire is sufficient to produce a misfire threshold crossing and yet have sufficient time to return to normal steady state conditions by the subsequent cylinder firing. This is desirable so that a misfire event shows up in one and only one cylinder firing event.

The PLL 30 system is designed to reject steady state deceleration in the engine and yet have good sensitivity to changes in deceleration that are more characteristic of a misfire. In addition, the phase error accumulator 42 is preferably programmed to reject error related to acceleration and integrate deceleration error signals only. This minimizes the effects of normal driving variations.

The loop filter 34 may have any transfer function that allows the loop to track engine RPM changes under normal conditions with a minimum of phase error, but highlights phase error typical of rapid deceleration such as during misfire events.

The engine control system compares the misfire indications with the throttle position sensor input. Rapid changes in RPM caused by operator actuation of the throttle are rejected by the engine control system. Only those misfire indications, not associated with rapid decreases in RPM caused by operator actuation of the throttle are counted. The invention comprises a means to detect engine misfires by detecting rapid engine decelerations caused by those misfires. This may be accomplished using a feedback means such as, but not limited to, a phase locked loop and analyzing of the error of such means. This error may be the difference between engine crank position and a feedback signal tracking that position. Error results when the two are not equal and this error continues until the tracking signal "catches up" to the engine speed signal. Error is therefore created when the engine decelerates or accelerates. Hence there is a transient error signal related to (typically proportional to) the rate of engine deceleration.

This error (typically a phase error as in the case of a phase locked loop) amplitude (and/or duration and/or frequency and/or other appropriate quantity) is accumulated and compared to a threshold. If a given threshold is exceeded, it can be determined that the engine has experienced a misfire.

The invention also comprises making the misfire detection system adaptive. That is, such adaptation produces essentially the same difference (or the same percentage change difference) between accumulated error and threshold for a cylinder misfiring at idle (under no external load) as for a cylinder misfiring at 4,000 RPM (under the same load). This can be accomplished in several ways according to the following embodiments of the invention:

1. Parameters of the system which are typically fixed in other applications (e.g. the forward loop transfer function of the PLL loop filter) may vary with RPM such that the accumulated or other/error remains approximately constant as RPM varies and load remains the same.
2. Conversely, the system (e.g., loop) dynamics may remain fixed, and the threshold level modified as RPM (and/or load) varies. In this embodiment the difference between the (accumulated or other) error and the threshold is kept essentially fixed for similar degrees of misfire as RPM varies.
3. The system may comprise some combination of varying threshold and varying (accumulated or other) error (e.g., varying with RPM and/or load) with appropriate lookup tables to compare given accumulated error at a given condition with a given threshold at the same condition.

Each of the differences used for comparison with a threshold discussed above may be a percentage difference of a signal relative to a variable (or non-variable) baseline. And though the error is typically an accumulated value, it does not have to be, and can, in fact, be an instantaneous error value as well. Further, it can be an average, a weighted average, a summation, an integration or any suitable combination of sub-values (e.g.'s, instantaneous or limited time period error values) of error values.

The invention also comprises other types of feedback loops where an error develops between expected behavior of the engine (i.e., the tracking signal) and actual behavior. For example, the signal may be a speed or acceleration signal instead of, or in addition to, a position signal.

Although specific means to accomplish the error detection and comparison are discussed in detail herein, any such means to accomplish the same end is comprised by the invention. That is, the invention is not limited to specific configurations for filtering, transfer functions, and the like discussed in any particular embodiment herein.

While only a few embodiments of the invention are illustrated and described, the invention is limited only by the scope of the appended claims.

We claim:

1. A system for determining the occurrence of a misfire in an internal combustion engine including oscillating means for producing an oscillating signal, means coupled to the oscillating means for comparing an engine ignition timing signal with the oscillating signal and for generating a phase error signal from the comparison, means coupled to the means for comparing for producing a tracking signal which tracks changes in engine speed, the oscillating means being coupled to the means for producing the tracking signal and responsive to the tracking signal therefrom for generating the oscillating signal whose frequency changes in relation to changes in the tracking signal, said means for comparing being connected to said means for producing the oscillating signal for comparing the oscillating signal to the engine ignition timing signal, and means coupled to the means for comparing for receiving said error signal and responsive to changes in the error signal indicative of engine cylinder misfire and non-responsive to changes in the error signal associated with normal engine operation and for producing a cylinder misfire signal.

2. The system set forth in claim 1 wherein the means for producing a tracking signal comprises loop filter means, and means coupled to the loop filter means and responsive to the engine revolutions per unit time for controlling the response of said loop filter means.

3. The system set forth in claim 2 wherein the means responsive to changes in the error signal comprises means for comparing the error signal to a reference signal and for producing a misfire signal when at least one of the amplitude and duration of the error signal exceeds a pre-determined value.

4. The system set forth in claim 3 and including means for counting the misfire signals from the means responsive to changes in the error signal.

5. The system set forth in claim 4 wherein the means for counting includes means for rejecting signals associated with rapid changes in throttle position.

6. The system set forth in claim 5 wherein the means for comparing is operative to provide an output signal having an alternating component and a DC error component upon the occurrence of rapid engine deceleration incident to a cylinder misfire.

7. The system set forth in claim 6 wherein the means for producing the tracking signal includes means for providing a tracking signal to the oscillating means which varies linearly with normal engine acceleration or deceleration.

8. The system set forth in claim 7 wherein said means for generating the oscillating signal is a voltage controller oscillator.

9. The system set forth in claim 8 and including means for counting misfire signals from the means responsive to changes in the error signal.

10. The system set forth in claim 9 and wherein the means for counting includes means for rejecting signals associated with rapid changes in throttle position.

11. The system set forth in claim 1 wherein the means for producing the tracking signal includes means for producing an input signal to the oscillating means which varies linearly with normal engine acceleration or deceleration.

12. The system set forth in claim 1 wherein said means for generating oscillating signal is a voltage controller oscillator.

13. A system for determining the occurrence of a misfire in an internal combustion engine including oscillating means for producing an oscillating signal, phase detecting means coupled to receive an engine timing signal and the oscillating signal and for producing an error signal functionally relating to phase difference between said signals, loop filter means coupled to said phase detecting means for receiving said error signal and for producing a tracking signal which tracks engine acceleration and deceleration, said oscillating means being coupled to receive the output signal from the loop filter and for producing an oscillating signal functionally related thereto, phase error signal responsive means coupled to receive the error signal from said phase detector and for producing a cylinder misfire signal when the magnitude of at least one of the duration and magnitude of the error signal exceeds a predetermined value.

14. The system set forth in claim 13 wherein said phase detecting means is operative to generate a phase error signal.

15. The system set forth in claim 13 and including control means coupled to said loop filter and to receive said engine timing signal for supplying a control signal to said loop filter means in response to said engine timing signal.

16. A method for determining the occurrence of a misfire in an internal combustion engine including the steps of generating an oscillating signal, comparing an engine ignition timing signal from the engine with the oscillating signal, generating a phase error signal from the comparison of the engine timing signal and the oscillating signal, generating a tracking signal in response to the error signal which tracks changes in engine speed, modifying the oscillating signal as a function of the tracking signal, sensing the occurrence of a transient deceleration of the engine speed from at least one of the amplitude and duration of the error signal indicative of engine misfires, and rejecting changes in error signal associated with linear acceleration and deceleration, and counting said occurrences.

17. The method set forth in claim 16 wherein the step of generating an error signal comprises generating a phase error signal.

18. The method set forth in claim 16 and including the step of generating a control signal functionally related to the engine revolutions per unit time, and controlling the generation of said tracking signal in relation to said control signal.

19. The method set forth in claim 16 wherein the sensing step includes comparing the error signal to a reference signal.

20. The method set forth in claim 16 and including the step of counting the occurrences of engine misfire.

21. The method set forth in claim 16 wherein the step of generating the error signal includes the step of generating a signal having an alternating component and a DC component related to change in engine speed.

22. The method set forth in claim 16 wherein the step of generating the tracking signal includes producing a tracking signal which varies linearly with normal changes in engine acceleration and deceleration.

23. A system for determining the occurrence of a misfire in an internal combustion engine including phase locked loop means coupled to received an engine timing signal from an internal combustion engine, said phase locked loop means including means for generating an oscillating signal locked to the engine timing signal and means for comparing the engine timing signal to the oscillating signal and for producing an error signal in response to deviations therebetween, and means for producing a cylinder misfire signal when the error signal exceeds a reference value.

24. The system set forth in claim 23 wherein said means for producing an error signal includes means for generating a phase error signal.

25. A system for determining the occurrence of a misfire in an internal combustion engine including oscillating means for producing an oscillating signal, means coupled to the oscillating means for comparing an engine ignition timing signal with the oscillating signal and for generating an error signal from the comparison, said error signal having an alternating component and a DC error component upon the occurrence of rapid engine deceleration incident to a cylinder misfire, means coupled to the means for comparing for producing a tracking signal which tracks changes in engine speed, the oscillating means being coupled to the means for producing the tracking signal and responsive to the tracking signal therefrom for generating the oscillating signal whose frequency changes in relation to changes in the tracking signal, said means for comparing being connected to said means for producing the oscillating signal for comparing the oscillating signal to the engine ignition timing signal, and means coupled to the means for comparing for receiving said error signal and responsive to changes in the error signal indicative of engine cylinder misfire and non-responsive to changes in the error signal associated with normal engine operation and for producing a cylinder misfire signal.

26. A system for determining the occurrence of a misfire in an internal combustion engine including oscillating means for producing an oscillating signal, means coupled to the oscillating means for comparing an engine ignition timing signal with the oscillating signal and for generating an error signal from the comparison, loop filter means coupled to the means for comparing for producing a tracking signal which tracks changes in engine speed, means coupled to the loop filter means and responsive to the engine timing signal for controlling the response of the loop filter means, the oscillating means being coupled to the means for producing the tracking signal and responsive to the tracking signal therefrom for generating the oscillating signal whose frequency changes in relation to changes in the tracking signal, said means for comparing being connected to said means for producing the oscillating signal for comparing the oscillating signal to the engine ignition timing signal, and means coupled to the means for comparing for receiving said error signal and responsive to changes in the error signal indicative of engine cylinder misfire and non-responsive to changes in the error signal associated with normal engine operation and for producing a cylinder misfire signal.

27. A system for determining the occurrence of a misfire in an internal combustion engine including oscillating means for producing an oscillating signal, means coupled to the oscillating means for comparing an engine ignition timing signal with the oscillating signal and for generating an error signal from the comparison, loop filter means coupled to the means for comparing for producing a tracking signal which tracks changes in engine speed, means coupled to the loop filter means and responsive to engine revolutions per unit time for controlling the response of the loop filter means, the oscillating means being coupled to the means for producing the tracking signal and responsive to the tracking signal therefrom for generating the oscillating signal whose frequency changes in relation to changes in the tracking signal, said means for comparing being connected to said means for producing the oscillating signal for comparing the oscillating signal to the engine ignition timing signal, and means coupled to the means for comparing for receiving said error signal and responsive to changes in the error signal indicative of engine cylinder misfire and non-responsive to changes in the error signal associated with normal engine operation and for producing a cylinder misfire signal.

28. A method for determining the occurrence of a misfire in an internal combustion engine including the steps of generating an oscillating signal, comparing an engine ignition timing signal from the engine with the oscillating signal, generating an error signal from the comparison of the engine timing signal and the oscillating signal, generating a tracking signal in response to the error signal which tracks changes in engine speed, generating the oscillating signal as a function of the tracking signal, sensing the occurrence of a transient deceleration of the engine speed from at least one of the amplitude and duration of the error signal indicative of engine misfires, sensing changes in throttle position and rejecting changes in error signal associated with linear acceleration and deceleration resulting from rapid changes in throttle position, and counting said occurrences.

29. A method for determining the occurrence of a misfire in an internal combustion engine including the steps of generating an oscillating input signal, comparing an engine ignition timing signal from the engine with the oscillating signal, generating an error signal from the comparison of the engine timing signal and the oscillating signal, generating an oscillator input signal which tracks changes in the error signal incident to engine acceleration and deceleration, controlling the oscillating signal in relation to changes in the oscillator input signal, generating a tracking signal in response to the error signal which tracks changes in engine speed, generating the oscillating signal as a function of the tracking signal, sensing the occurrence of a transient deceleration of the engine speed from at east one of the amplitude and duration of the error signal indicative of engine misfires, sensing changes in throttle position and rejecting changes in error signal associated with linear acceleration and deceleration resulting from rapid changes in throttle position, and counting said occurrences.

30. A system for determining the occurrence of misfire in an internal combustion engine having a rotatable shaft, said system comprising:

means for monitoring an engine parameter functionally related to the rotational position of the engine shaft and for generating a signal functionally related to said engine parameter, means coupled to said monitoring means for generating a tracking signal which tracks the engine parameter, means for generating a phase error signal comprising the difference in phase between the monitored engine parameter and the tracking signal, and correcting means coupled to the phase error signal generating means and responsive to the phase error signal for correcting the tracking signal, whereby significant changes in the magnitude of the phase error signal indicates the occurrence of engine misfire.

31. The system set forth in claim 30 wherein the shaft comprises a crankshaft, said means for monitoring an engine parameter comprising means for sensing the rotational position of the crankshaft.

32. The system set forth in claim 30 wherein the shaft comprises a crankshaft, said means for monitoring an engine parameter comprising means for sensing the rotational velocity of the crankshaft.

33. The system set forth in claim 30 wherein the shaft comprises a crankshaft, said means for monitoring an engine parameter comprising means for sensing the rotational acceleration of the crankshaft.

34. The system set forth in claim 30 wherein said correcting means comprises loop filtering means.

35. The system set forth in claim 30 wherein the correcting means comprises a phase locked loop circuit.

36. The system set forth in claim 30 and including signal processor means for rejecting the phase error signal if said phase error signal has an algebraic sign consistent with engine acceleration.

37. The system set forth in claim 30 and including a loop filter for modifying the error signal, and comparison means for comparing the phase error signal to a threshold value for determining the occurrence of an engine misfire.

38. A method for determining the occurrence of a misfire in an internal combustion engine having a rotatable shaft and including the steps of, monitoring an engine parameter functionally related to the rotational position of the engine shaft and generating a signal indicative of the engine parameter, generating a tracking signal which tracks the engine parameter, generating a phase error signal comprising the difference in phase between the monitored engine parameter and the tracking signal and correcting the tracking signal in response to the phase error signal whereby a sufficiently substantial change in the magnitude of the phase error signal indicates the occurrence of engine misfire.

39. The method set forth in claim 38 and including the step of employing in the correcting step a transfer function utilizing at least one time constant which varies dynamically with engine speed such that the phase error signal for occurrence of engine misfire remains approximately constant as engine speed varies.

40. The method set forth in claim 38 and including the step of comparing the phase error signal with a threshold value which varies with engine speed for determining the sufficiency of the magnitude in changes of the phase error signal for indicating the occurrence of engine misfire.

41. The method set forth in claim 38 including the step of sensing throttle position for indicating operator induced deceleration and rejecting phase error signals associated with operator induced decelerations to indicate the occurrence of engine misfire.

42. The method set forth in claim 38 and including the steps of comparing phase error signal with a threshold value for determining the sufficiency of the magnitude of the phase error signal necessary to indicate engine misfire, and varying one of the phase error signal and the threshold value with engine RPM whereby the value obtained by the comparison remains approximately constant.

43. The method set forth in claim 38 and including the steps of sensing throttle position for indicating operator induced accelerator and rejecting phase error signals associated with operator induced deceleration.

* * * * *

UNITED STATES PATENT AND TRADEMARK OFFICE
CERTIFICATE OF CORRECTION

PATENT NO. : 5,581,022
DATED : Dec. 3, 1996
INVENTOR(S) : Sprague et al.

It is certified that error appears in the above—identified patent and that said Letters Patent is hereby corrected as shown below:

Column 6, line 4, please change "accumulated or other/error" to read -- (accumulated or other) error --.

Claim 3, column 7, line 1, "2" should be --1--.

Claim 17, column 8, lines 7-9, should be deleted.

Claim 29, column 10, line 1, "east" should be --least--.

Signed and Sealed this

Eleventh Day of March, 1997

Attest:

BRUCE LEHMAN

Attesting Officer

Commissioner of Patents and Trademarks